(12) United States Patent
Tamaura

(10) Patent No.: US 9,182,146 B2
(45) Date of Patent: Nov. 10, 2015

(54) CROSS LINEAR TYPE SOLAR HEAT COLLECTING APPARATUS

(75) Inventor: Yutaka Tamaura, Tokyo (JP)

(73) Assignee: TOKYO INSTITUTE OF TECHNOLOGY, Tokyo (JP)

( * ) Notice: Subject to any disclaimer, the term of this patent is extended or adjusted under 35 U.S.C. 154(b) by 375 days.

(21) Appl. No.: 13/819,117

(22) PCT Filed: Sep. 29, 2011

(86) PCT No.: PCT/JP2011/005504
§ 371 (c)(1),
(2), (4) Date: Feb. 26, 2013

(87) PCT Pub. No.: WO2012/042888
PCT Pub. Date: Apr. 5, 2012

(65) Prior Publication Data
US 2013/0152916 A1      Jun. 20, 2013

(30) Foreign Application Priority Data
Oct. 1, 2010 (JP) .................. 2010-223719

(51) Int. Cl.
*F24J 2/02* (2006.01)
*F24J 2/38* (2014.01)
(Continued)

(52) U.S. Cl.
CPC *F24J 2/38* (2013.01); *F24J 2/0483* (2013.01); *F24J 2/07* (2013.01); *F24J 2/16* (2013.01); *F24J 2/5241* (2013.01); *F24J 2/541* (2013.01);
(Continued)

(58) Field of Classification Search
CPC .................................. Y02E 10/47; F24J 2/07

USPC .................... 126/600, 680, 608, 696
See application file for complete search history.

(56) References Cited

U.S. PATENT DOCUMENTS 4,159,710 A     7/1979   Prast
4,227,513 A * 10/1980   Blake et al. ................... 126/578
(Continued)

FOREIGN PATENT DOCUMENTS

JP      1986-22016 U     2/1986
JP      2003-329963 A     11/2003
(Continued)

OTHER PUBLICATIONS

PCT, "International Search Report for PCT/JP2011/005504", Jan. 10, 2012.

*Primary Examiner* — Avinash Savani
(74) *Attorney, Agent, or Firm* — Manabu Kanesaka

(57) ABSTRACT

It is to heighten the heat collecting efficiency of a linear type solar heat collecting apparatus.
A plurality of reflection lines and one reception line are included. The reflection lines are arranged in parallel substantially in the south-north direction on earth. Each reflection line L1, L2, . . . has a heliostat 1. The heliostat 1 is composed of a plurality of mirror segments disposed in series on each reflection line L1, L2, . . . . The reception line C extends in the east-west direction perpendicular to the reflection lines L1, L2, . . . , and is disposed at a predetermined position above the reflection lines L1, L2, . . . . The reception line C has a single receiver. The mirror segments disposed on each reflection line L1, L2, . . . radiate reflected light of sunlight that has impinged on the mirror surface toward the reception line C. The receiver 2 disposed on the reception line C collects the heat of the reflected light of sunlight radiated from the mirror segments disposed on each reflection line.

13 Claims, 10 Drawing Sheets

(51) Int. Cl.
*F24J 2/07* (2006.01)
*F24J 2/16* (2006.01)
*F24J 2/52* (2006.01)
*F24J 2/54* (2006.01)
*G02B 7/183* (2006.01)
*F24J 2/04* (2006.01)
*F24J 2/00* (2014.01)
*F24J 2/10* (2006.01)

(52) U.S. Cl.
CPC ......... *G02B 7/183* (2013.01); *F24J 2002/0084* (2013.01); *F24J 2002/108* (2013.01); *Y02E 10/41* (2013.01); *Y02E 10/47* (2013.01)

(56) References Cited

U.S. PATENT DOCUMENTS

| | | | |
|---|---|---|---|
| 6,035,850 A * | 3/2000 | Deidewig et al. | 126/696 |
| 2009/0056699 A1* | 3/2009 | Mills et al. | 126/600 |
| 2009/0056703 A1 | 3/2009 | Mills et al. | |
| 2010/0012112 A1 | 1/2010 | Le Lievre et al. | |
| 2013/0037072 A1* | 2/2013 | Powell | 136/206 |
| 2013/0152914 A1* | 6/2013 | Martinez-Val Penalosa et al. | 126/600 |

FOREIGN PATENT DOCUMENTS

JP 2009-218383 A 9/2009
JP 2010/050107 A1 5/2010

* cited by examiner

Column-wise direction

Row-wise direction

CROSS LINEAR TYPE SOLAR HEAT COLLECTING APPARATUS

RELATED APPLICATIONS

The present application is National Phase of International Application No. PCT/JP2011/005504 filed Sep. 29, 2011, and claims priority from Japanese Application No. 2010-223719, filed Oct. 1, 2010.

TECHNICAL FIELD

This invention relates to a linear type solar heat collecting apparatus formed by arranging sunlight reflection lines in parallel, and, more particularly, to a cross linear type solar heat collecting apparatus that has a reception line placed so as to perpendicularly intersect the reflection lines arranged in parallel, and relates to a solar heat collecting apparatus that uses the cross linear type solar heat collecting apparatus as a relay.

BACKGROUND ART

A so-called linear Fresnel solar heat collecting apparatus is known as a conventional linear type solar heat collecting apparatus formed by arranging solar-heat reflection lines in parallel.

An example of such a conventional linear type solar heat collecting apparatus is shown as Conventional Example 1 in FIG. 11a and FIG. 11b (see Non-patent Document 1 and Patent Document 1). In the linear Fresnel solar heat collecting apparatus of Convention Example 1, a plurality of reflection lines L1, L2, ... are arranged in parallel on the ground, and reception lines C1, C2, ... are arranged in parallel with the direction of the reflection lines at predetermined intervals above the reflection lines L1, L2, ... in such a way as to extend like bridges across the reflection lines. In each reflection line L1, L2, ..., many rectangular mirror plates H, H, ... that serve as a heliostat are arranged, and, in each reception line C1, C2, ..., receivers (solar heat collectors) R, R, ... are arranged in parallel at a predetermined interval therebetween.

In FIG. 11b, the mirror plates H, H, ... of each line have their turning angles that are individually controlled so as to turn on a central rotational shaft of each reflection line L1, L2, ... , and reflect sunlight that has impinged on their specular surfaces, so that light reflected therefrom is received by a nearby receiver R. Heat of the reflected light received by the receiver R is converted into high-temperature water vapor via a heat medium. Each reflection line L1, L2, ... and the receiver R are disposed in parallel in the south-north direction, and the angle of each reflection line undergoes a rotational adjustment in the east-west direction so that the mirror plates H, H, ... disposed on each reflection line L1, L2, ... track the movement of the sun and, as a result, light reflected therefrom is always collected near the receiver R.

The solar heat collecting apparatus is used in, for example, a solar thermal power generation system. A parabolic trough type solar thermal power generation system and a central tower type solar thermal power generation system have already been operated as commercial plants for the solar heat collecting apparatus used in the solar thermal power generation system. In the parabolic trough type solar thermal power generation system, a gutter-shaped parabolic mirror is used, and a heat medium (for example, oil) flowing through the pipe is heated while focusing sunlight on a pipe disposed at the focal position of the mirror, so that electric power is generated by the resulting thermal energy. In the central tower type solar thermal power generation system, a plane mirror provided with a sun tracker is used, and sunlight is collected while focusing sunlight on a solar heat collector of a tower disposed at its central part, so that electric power is generated by the resulting heat collected by a heat medium allowed to flow to the upper part of the tower.

The parabolic trough type solar thermal power generation system is comparatively low in cost, but is low in the temperature of a heated heat medium, and therefore, disadvantageously, has difficulty in achieving high efficiency, whereas the central tower type solar thermal power generation system is capable of obtaining a high-temperature heat medium, but needs a highly accurate light-collecting capability, and therefore, disadvantageously, is high in cost.

On the other hand, the linear Fresnel solar heat collecting apparatus is one of the solar heat collecting apparatuses to which the most attention is paid as a commercial plant for the solar thermal power generation system from the fact that the linear Fresnel solar heat collecting apparatus is more insusceptible to the wind, and has a less rigid, simpler structure, and is higher in land-use efficiency, and therefore can realize a lower power generation cost than the parabolic trough type or the central tower type solar heat collecting apparatus.

Although the linear Fresnel solar heat collecting apparatus is characterized by having a simpler structure and realizing a lower power generation cost than the parabolic trough type or the central tower type power generator as mentioned above, a problem resides in the fact that the optical loss of sunlight becomes great for the following causes, and it is difficult to obtain high light/heat-collecting efficiency.

The optical loss of sunlight is caused by, for example, the fact that a beam of incident light is kicked on a mirror plate (which is called "cosine loss"), the fact that a beam of light reflected by a mirror plate is intercepted by another mirror plate (which is called "blocking"), or the fact that a beam of light incident on a mirror plate is intercepted by another mirror plate (which is called "shadowing").

Among the causes of the optical loss, the occurrence of "cosine loss" and that of "blocking" are shown in FIG. 12 as an image. "Shadowing" is conspicuously caused especially when incident sunlight diagonally impinges on a mirror, and therefore "shadowing" is not shown in FIG. 12.

Such an optical loss is liable to become great when the inclination angle of a mirror H with respect to the ground level is great or when a change in the rotation angle of a mirror H is great in the angle adjustment of the mirror H performed in accordance with a sun altitude. In FIG. 12, for example, when a receiver R of the conventional linear Fresnel solar heat collecting apparatus is arranged in the south-north direction, rays of light reflected from mirror plates H, H, ... are apparently radiated toward the single receiver R by inclining the mirror plates H, H, ... , which have been arranged on the reflection line, in the east-west direction. Therefore, the inclination angle of a mirror with respect to the ground level becomes greater in proportion to an increase in distance of the mirror placed on the reflection line from the receiver R, and the optical loss caused by "cosine loss" and "blocking" is great.

Moreover, in order to follow the tracks of the sun from morning to evening, the mirror plate undergoes a great change in its adjustment angle greater than about Plus or minus an angle of 45 degrees in the east-west direction, and therefore the optical loss caused by "cosine loss" and "blocking" becomes great especially when the sun altitude is low in the morning and evening, and the amount of change of light-collection/heat-collection energy during a day is large. Therefore, the upper limit of temperature obtained as a result of a low degree of light convergence falls within 400 degrees to 500 degrees in water vapor, and a high temperature of 600 degrees or more cannot be obtained.

Additionally, even if many mirror plates are arranged on reflection lines in the east-west direction and even if a wide mirror installation space is provided, the above-mentioned optical loss becomes increasingly greater in mirror plates distant from a receiver, and therefore high light collecting efficiency cannot be obtained. Still additionally, a single receiver has its limitations on the number of mirror plates that radiate reflected light so as to be received by this receiver, and therefore, if many mirror plates are arranged in a wide range, there is a need to assign one reception line to each group of mirror plates the number of which is predetermined, and a receiver R is required to be provided for each reception line, and the heat of reflected light received by each receiver R must be gathered and taken out. For these reasons, the limit temperature obtained by the conventional linear Fresnel solar heat collecting apparatus has been about 500 degrees at the most.

As a method for reducing the above-mentioned optical loss, Patent Document 2 proposes a linear Fresnel solar heat collecting system in which both the longitudinal direction of each reflection line and the longitudinal direction of a receiver are arranged in parallel in the east-west direction. This system is described as Conventional Example 2. Briefly speaking, in the system of Conventional Example 2, each mirror plate H, H, . . . on each reflection line L1 (L2, L3, . . . ) is rotated only in the south-north direction without being rotated in the east-west direction with respect to the track of the sun so as to guide reflected light to the receiver, as shown in FIG. 13.

According to this method, the rotation angle of a mirror in the south-north direction is a small angle not exceeding several degrees during a day (morning and evening), and is a small angle of about Plus or minus an angle of 15 degrees during a year, and therefore the above-mentioned optical loss can be greatly reduced. Therefore, the total amount of heat-collection energy received by the receiver R can also be increased by arranging many mirror plates in the south-north direction and by increasing an installation space for the mirror plates.

However, in the system of Conventional Example 2, the angle of the mirror in the east-west direction cannot be adjusted, and therefore, especially when the sun altitude is low in the morning and evening, a linear light-collection range into which light is converged by the mirror plates greatly deviates from the receiver, and, disadvantageously, the heat-collection energy during a day greatly varies.

Additionally, in either of Conventional Examples 1 and 2, the conventional linear Fresnel solar heat collecting apparatus has a structure in which the reflection line and the receiver are arranged in parallel with each other, and therefore rays of light collected on the receiver become a linear irradiation range that is substantially uniform. Disadvantageously, in this irradiation range, the re-radiation of heat becomes great when the temperature rises to a high temperature of about 600 degrees, and the efficiency of the amount of heat absorbed by a heat medium is easily deteriorated.

CITATION LIST

Patent Literature

[PTL 1]
US2009/0056703 A1: Applicant, Ausra Inc., "LINEAR FRESNEL SOLAR ARRAYS AND COMPONENTS THEREFOR"

[PTL 2]
US2010/0012112 A1: Applicant, AUSRA PTY LIMITED, "ENERGY COLLECTOR SYSTEM HAVING EAST-WEST EXTENDING LINEAR REFLECTORS"

Non Patent Literature

[NPL 1]
Solar 2004: Life, the Universe and Renewables, "Steam-circuit Model for the compact Linear Fresnel Reflector Prototype"

SUMMARY OF INVENTION

Technical Problem

Problems to be solved reside in the fact that in the conventional so-called linear Fresnel solar heat collecting apparatus, the optical loss caused by "cosine loss," "blocking," or "shadowing" on mirror plates is great in the method of Conventional Example 1, and therefore the limit of heating temperature is 500 degrees, and the heat-collection energy during a day greatly varies; the fact that the optical loss becomes increasingly greater in proportion to an increase in distance from the receiver in the method of Conventional Example 1 even if many mirror plates are arranged in a wide range, and therefore there are limitations on light collecting efficiency; and the fact that, when the temperature rises to a high temperature of about 600 degrees, the re-radiation of heat becomes great in the irradiation range on the receiver, and the efficiency of the amount of heat absorbed by a heat medium is easily deteriorated in either method of Conventional Examples 1 and 2.

It is an object of the present invention to solve the above-mentioned problems of the conventional linear Fresnel solar heat collecting apparatus and to provide a cross linear type solar heat collecting apparatus capable of realizing a heating temperature of 600 degrees or more and capable of reducing a variation in the light-collection/heat-collection energy with respect to a change in the sun altitude during a day.

Solution to Problem

To solve the problems, the cross linear type solar heat collecting apparatus according to the present invention is characterized by arranging a plurality of reflection lines in parallel in the south-north direction, by setting a single reception line in the east-west direction so as to perpendicularly intersect the arrangement direction of the reflection lines, by disposing a heliostat on each reflection line, and by adjusting the angle of a mirror surface and then radiating sunlight that has impinged on each part of the reflection lines toward the reception line. The most distinguishing feature of the cross linear type solar heat collecting apparatus is that a plurality of mirror segments are disposed on each reflection line in a row-wise direction (i.e., south-north direction) so that angle adjustment can be performed in the row-wise direction (south-north direction) and in a column-wise direction (east-west direction), and sunlight that has impinged on the mirror segments and that has been reflected therefrom is collected on a receiver disposed on the reception line.

The conventional linear type solar heat collecting apparatus is structured by arranging the reflection lines and the reception lines in parallel with each other, whereas the linear type solar heat collecting apparatus of the present invention has a linear type reception line disposed so as to perpendicularly intersect a linear type reflection lines, and hence is called a "cross linear type solar heat collecting apparatus."

Advantageous Effects of Invention

According to the apparatus of the present invention, the optical loss caused by "cosine loss," "blocking," or "shadowing" can be made considerably smaller, and the reflection line can be made longer in the south-north direction while controlling the optical loss, and therefore the total amount of light-collection/heat-collection energy can be more easily heightened than the conventional linear Fresnel solar heat collecting apparatus that is disposed in a same-sized area for the degree of light convergence of sunlight.

Additionally, the reception line is merely required to be provided with a single receiver regardless of the number of reflection lines, and light reflected from the heliostat disposed in a wide range is converged on the single receiver, and therefore high-temperature water vapor or high-temperature air of 600 degrees or more can be generated easily, and a fairly high temperature of about 800 degrees can be obtained at low cost in conjunction with the central tower type solar heat collecting system.

DESCRIPTION OF EMBODIMENTS

Figure 1:
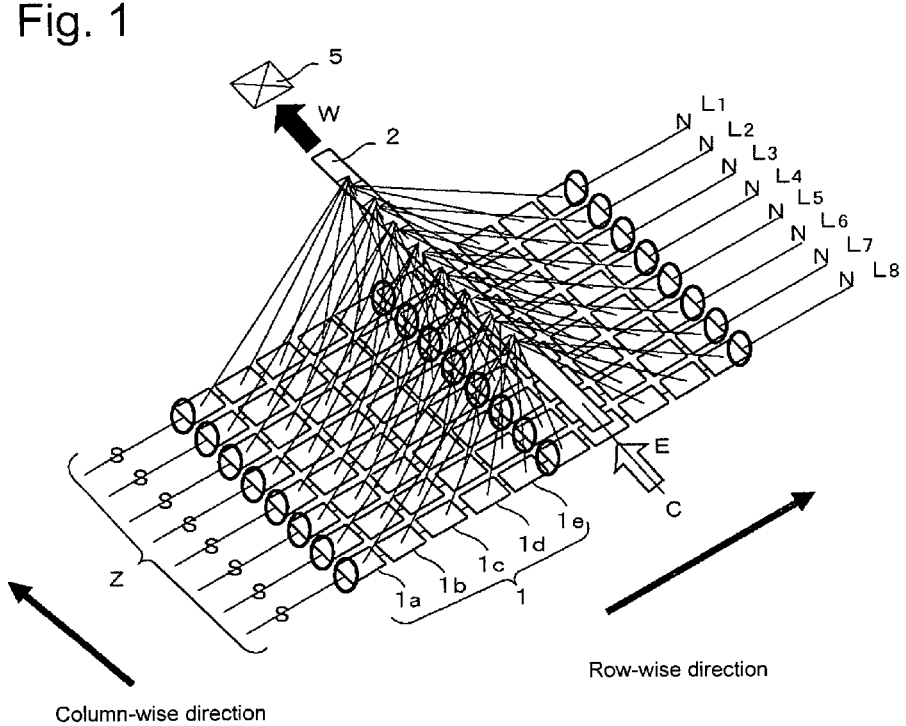
FIG. 1 is a view showing an arrangement example of heliostats and a receiver in an embodiment of the cross linear type solar heat collecting apparatus according to the present invention.

Embodiments of the present invention will be hereinafter described with reference to the drawings. In FIG. 1, the present invention is a cross linear type solar heat collecting apparatus that has a group of a plurality of reflection lines L1, L2, . . . and one reception line C. The reflection lines L1, L2, . . . are arranged in parallel with each other in a heat receiving zone Z set in the south-north direction (S-N) on the earth, and each reflection line is provided with a heliostat 1. Although this embodiment shows an example in which the total number of reflection lines is eight of from L1 to L8, the number of reflection lines is not limited to this, and may be set at an arbitrary number according to the present invention.

The heliostat 1 of each reflection line L1, L2, . . . radiates reflected light of sunlight that has impinged on each part of the reflection lines L1, L2, . . . toward the reception line C by adjusting the angle of a mirror surface on each reflection line (i.e., on each column).

On the other hand, the reception line C is arranged so as to perpendicularly intersect the reflection lines L1, L2, . . . and so as to occupy a predetermined position above the center of the reflection line in the east-west direction (E-W), and is provided with a single receiver 2. The receiver 2 receives the reflected light of sunlight radiated from the heliostat 1 of each reflection line, and collects its heat. If the heliostat is 1 m*2 m in size, the installation height of the receiver 2 is roughly 20 m.

In the present invention, the direction in which the reflection lines L1, L2, . . . extend is the south-north direction (S-N) on the earth, and the direction of the reception line C is the east-west direction (E-W). With regard to the arrangement direction of the reflection lines L1, L2, . . . , a slight deviation in the arrangement direction thereof is included within the range of the south-north direction, of course, when the direction of the reflection lines L1, L2, . . . is adjusted to exactly coincide with the south-north direction (S-N) on the earth and as long as the reflected light of sunlight that has impinged on the heliostat 1 of each reflection line L1, L2, . . . can be effectively received by the receiver 2 of the reception line C. The same applies to the reception line C. A slight deviation in the arrangement direction of the reception line C is included within the range of the east-west direction as long as the reflected light of sunlight from the heliostat 1 can be effectively received by the receiver 2.

Figure 2:
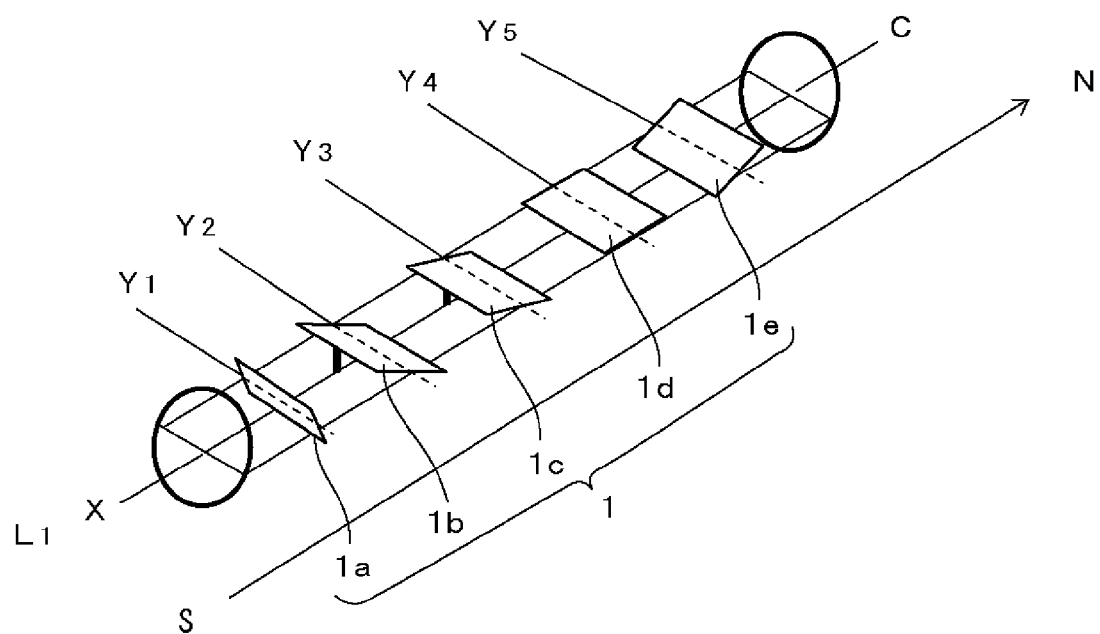
FIG. 2 is a view showing an arrangement manner of mirror segments disposed on a reflection line.

FIG. 2 depicts a structure of the heliostat 1 disposed on the reflection line L1 that is shown as a representative of the reflection lines. In the present invention, a plurality of mirror segments 1a, 1b, 1c, . . . that are components of the heliostat 1 are disposed on the reflection line L1 in a row-wise direction within a predetermined range on the ground. Likewise, in each reflection line L2, L3, . . . , a plurality of mirror segments 1a, 1b, 1c, . . . are arranged in the row-wise direction, and, as a result, the mirror segments 1a, 1b, 1c, . . . arranged in the row-wise direction are disposed in the heat receiving zone Z.

Figure 3:
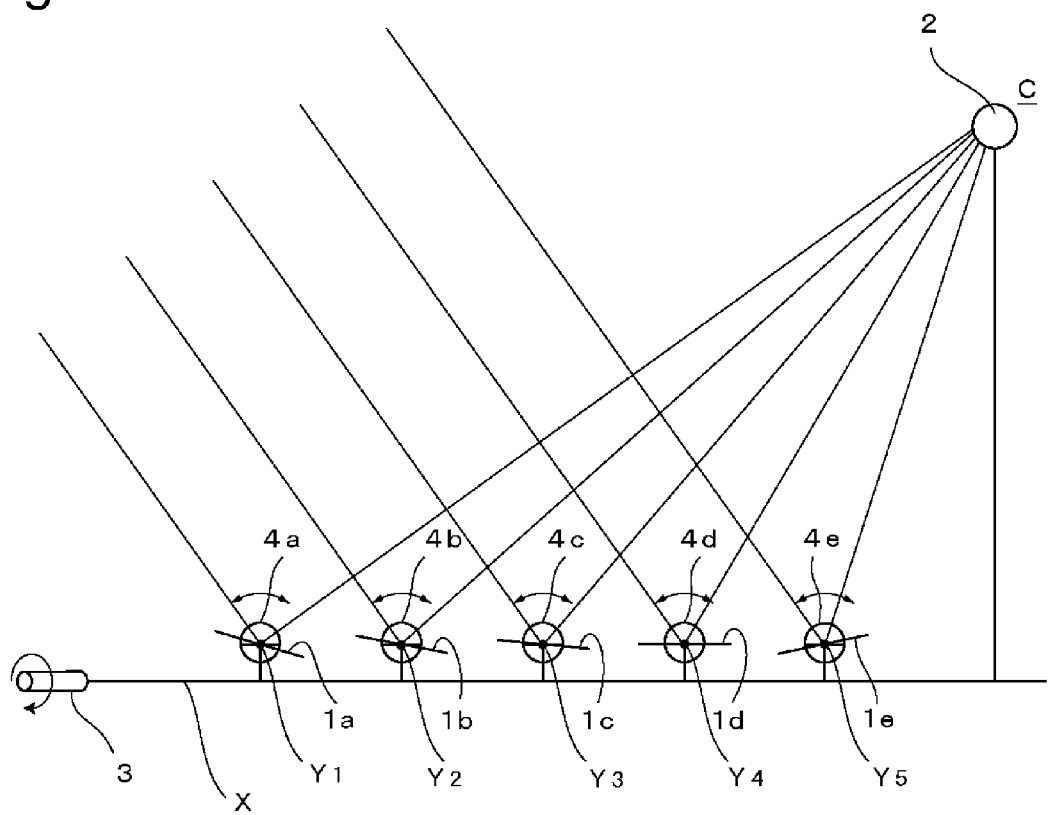
FIG. 3 is a view showing a manner in which the rotation angle of each mirror segment disposed on the reflection line is adjusted in south-north and east-west directions.

The mirror segments 1a, 1b, 1c, . . . of the same line are attached to a main rotational shaft X in common along the row-wise direction (south-north direction) as shown in FIG. 3, and the main rotational shaft X is controllably rotated in a column-wise direction (east-west direction) by a column-wise-direction driver 3, and the mirror segments 1a, 1b, 1c, . . . of each reflection line (i.e., of each column) undergo an adjustment to a rotational angle on the rotational shaft X.

On the other hand, the mirror segments 1a, 1b, 1c, . . . of each row are individually controlled and rotated by row-wise-direction drivers 4a, 4b, 4c, . . . attached to individual shafts Y1, Y2, Y3, . . . , respectively, in a direction (east-west direction) perpendicular to the reception line C, and individually undergo an adjustment to a rotational angle on each individual shaft Y1, Y2, Y3, . . . in the row-wise direction (south-north direction). The same applies to the heliostat 1 (mirror segments 1a, 1b, 1c, . . . ) disposed on each of the other reflection lines L2, L3, . . . although a description has been hereinbefore given of a manner to adjust the rotation angle of the heliostat 1 disposed on the reflection line L1 shown as a representative of the reflection lines.

The mirror segments 1a, 1b, 1c, . . . of each reflection line are each set to have a typical module, such as 1 m in length in the direction (south-north direction) of the reflection line and 2 m in length in the lateral direction (east-west direction). As an example, FIG. 1 shows a structure in which five mirror segments 1a, 1b, 1c, 1d, and 1e arranged in series are set as one unit as shown in FIG. 2, and two units arranged in series are provided on each reflection line L1, L2, . . . with a position between one unit and one unit as the center position of each column (i.e., each reflection line). However, the number of mirror segments is not limited to five mirror segments of which one unit is composed, and the number of units arranged on each reflection line is not limited to two units.

Additionally, in the present invention, the length of the reflection line on a northern side and that of the reflection line on a southern side are not necessarily required to be symmetrical with respect to the reception line extending in the east-west direction as a boundary line between the northern side and the southern side. For example, if the cross linear type solar heat collecting apparatus of the present invention is provided in the Northern Hemisphere, the length of the reflection line is set to be longer on the northern side than on the southern side, and the mirror installation space on the northern side is set to be wider than on the southern side, and, as a result, light collecting efficiency and heat collecting efficiency are heightened, because the track of the sun runs on the southern side with respect to the reception line. On the other hand, if the cross linear type solar heat collecting apparatus of the present invention is provided in the Southern Hemisphere, light collecting efficiency and heat collecting efficiency are heightened by making the length of the reflection line on the southern side longer than on the northern side.

In the above-mentioned reflection lines, a land possession area in which the reflection lines are disposed can be set to be longer in the row-wise direction (south-north direction) than in the column-wise direction (east-west direction). A light-collection optical system that has smaller optical loss than the conventional linear Fresnel solar heat collecting apparatus can be provided by disposing a receiver in the east-west direction, by irradiating a reception line while performing the angle adjustment of mirror segments, and by extending the reflection lines in the row-wise direction (south-north direction). Therefore, high heat-collection energy that has smaller loss can be obtained by forming mirror segments extended in the south-north direction. Additionally, the receiver in the east-west direction can be made shorter than that of the conventional linear Fresnel solar heat collecting apparatus, and therefore it is possible to reduce heat loss caused by re-radiation of absorbed heat.

Figure 4:
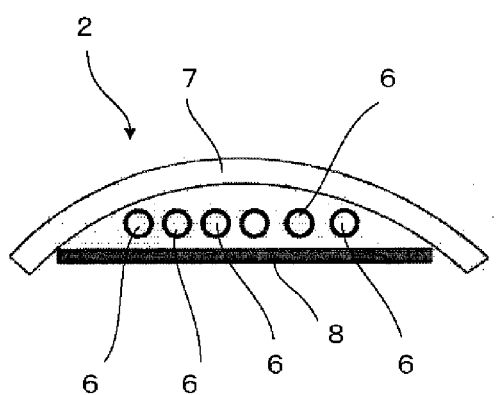
FIG. 4 is a sectional view showing an example of the structure of the receiver.

FIG. 4 shows an embodiment of the receiver 2. In this embodiment, the single receiver 2 has a plurality of heat collecting pipes 6, 6, . . . (for example, stainless pipes) the inside of each of which is filled with a heat medium (for example, air or steam) and that are arranged in parallel. The receiver 2 is disposed above all reflection lines (L1 to L8 in this embodiment) having heliostats in such a way as to extend like a bridge across the reflection lines, and one end of the receiver 2 is connected to a heat supply source 5 shown in FIG. 1. The heat collecting pipe 6 receives light reflected from the heliostat 1, thereafter collects the heat medium heated by reflected heat, and supplies this to the heat supply source 5.

In this embodiment, a space above the several heat collecting pipes 6 is covered with a heat-insulating outer wall 7, and a heat-absorbing net 8 that has a cavity window function is placed directly under a row of the heat collecting pipes 6. The heat-insulating outer wall 7 is a cross-sectionally circular-arc cover, and contains a group of the heat collecting pipes 6, 6, . . . arranged in parallel. The lower surface of the heat-insulating outer wall 7 is stopped with the heat-absorbing net 8. Convective heat loss caused by an ascending current in the heat-insulating outer wall 7 can be considerably restrained by projecting both edges of the heat-insulating outer wall 7 downwardly from the edges of the heat-absorbing net 8.

The heat-absorbing net 8 is a stainless mesh that has a parallel-crosses structure having a predetermined thickness, a honeycomb structure, or the like, and is structured to allow light reflected from a heliostat to pass through a mesh wall toward the inside. However, its radiation light cannot easily come out from inside the mesh wall.

Figure 5A:
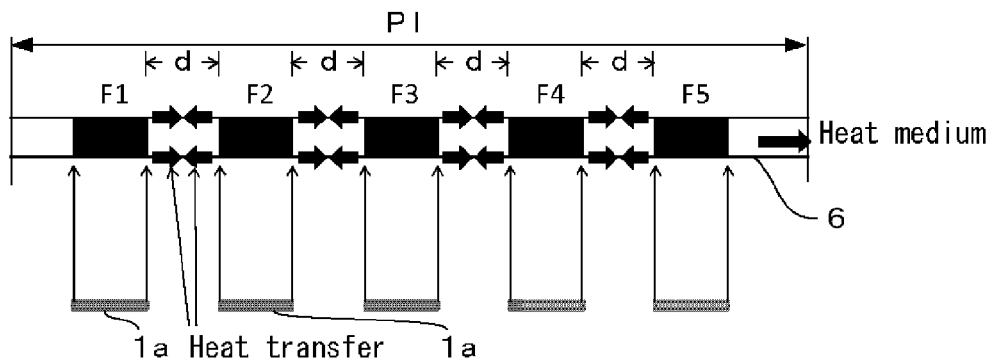
FIG. 5a is a view showing an example in which five irradiation ranges F1 to F5 are set within the range of the overall length of a heat collecting pipe provided in a receiver disposed on a reception line.

In the present invention, it is preferable to divide the heat collecting pipe 6 that is a component of the receiver 2 into irradiation ranges and non-irradiation ranges so as to alternately appear with a predetermined interval between the irradiation range and the non-irradiation range over the overall length of the heat collecting pipe 6, and it is preferable to increase the heat-transfer efficiency to a fluid contained in the heat collecting pipe by irradiating only each irradiation range with light reflected from the mirror segments 1a, 1b, . . . of each reflection line. FIG. 5a shows an example in which five irradiation ranges F1 to F5 are provided within the range of the overall length of the heat collecting pipe 6 (length P1) having the receiver 2 on the reception line C.

A non-irradiation range d is secured within the extent of a predetermined length between adjoining ranges of the irradiation ranges F1 to F5, and the irradiation ranges F1 to F5 are substantially evenly separated and disposed over the substantially overall length of the length P1 of the heat collecting pipe 6. With regard to the irradiation ranges F1 to F5, reflected light with which the mirror segments 1a, 1a, . . . of each reflection line has been irradiated is radiated to the heat collecting pipe 6, and a heat medium contained in the heat collecting pipe 6 is heated. If the irradiation range F1 is defined as a starting end and if the irradiation range F5 is defined as a terminal end, the heat medium heated by the irradiation ranges F1 to F5 is heated by heat stored in each non-irradiation range d also when the heat medium passes through the non-irradiation ranges d, and is sent toward the heat supply source 5 shown in FIG. 1 from the irradiation range F5 that is a terminal end. When the non-irradiation range d is insulated from heat, heat radiation from this range to the outside is restrained, and therefore the heat medium contained in the heat collecting pipe 6 can be heated to an even higher temperature and be sent toward the heat supply source.

Figure 5B:
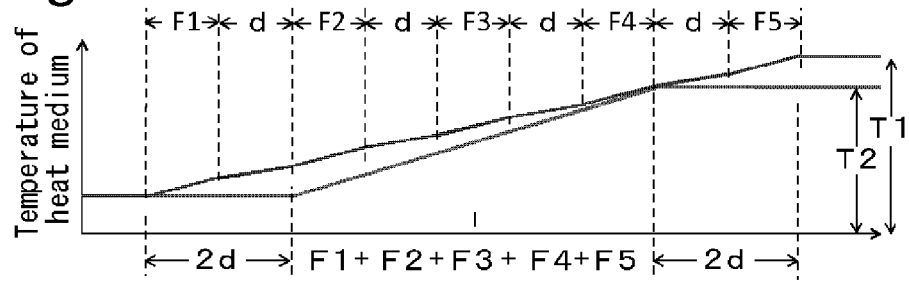
FIG. 5b is a view showing a comparison between temperature distribution T1 of a fluid with respect to the heat collecting pipe and temperature distribution T2 of a heat medium obtained when reflected light is radiated concentratedly to a specific range of the heat collecting pipe without securing non-irradiation ranges at both sides of each irradiation range F1 to F5.
Figure 5C:
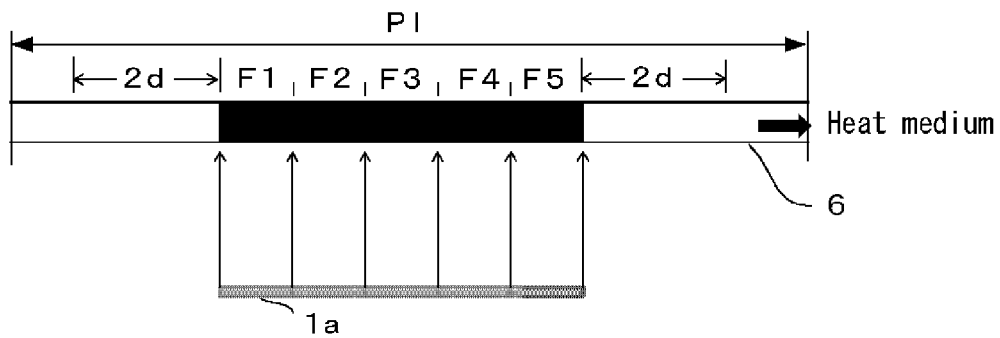
FIG. 5c is a view showing an example in which irradiation ranges F1 to F5 are disposed concentratedly in a specific range of the heat collecting pipe without securing non-irradiation ranges at both sides of each irradiation range F1 to F5.

FIG. 5*b* is a graph showing temperature distribution T1 of a heat medium with respect to the heat collecting pipe (length P1). For comparison, FIG. 5*c* shows temperature distribution T2 of a heat medium obtained when a specific range of the heat collecting pipe is concentratedly irradiated with reflected light without securing non-irradiation ranges at both sides of each irradiation range F1 to F5. As is apparent from comparison between both the temperature distributions, the temperature distribution of the heat medium contained in the heat collecting pipe 6 at a position beyond the irradiation range F5 is T1>T2.

According to the present invention, when the irradiation ranges F1 to F5 are heated by securing non-irradiation ranges d at both ends of each of the irradiation ranges F1 to F5, heat is transferred from the irradiation ranges F1 to F5 of the heat collecting pipe 6 to the non-irradiation ranges d secured at both ends of each of the irradiation ranges, and a heat transfer from the non-irradiation range 2*d* to the heat medium occurs in addition to a heat transfer from the irradiation ranges directly to the heat medium contained in the heat collecting pipe, and the time of contact of the heat medium with the heat collecting pipe 6 heated to a high temperature is increased. As a result, the amount of heat transferred from the heat collecting pipe to the heat medium contained therein is increased, and a high-temperature fluid can be sent to the heat supply source 5. The length of each of the irradiation ranges F1 to F5 and the length of the non-irradiation range d between adjoining irradiation ranges of the irradiation ranges F1 to F5 are not limited to specific lengths, respectively, and the lengths of the irradiation ranges F1 to F5 can be freely set to be equal or unequal to each other within the range of the overall length of the heat collecting pipe 6 (length P1).

In FIG. 1, the mirror segments 1*a*, 1*b*, . . . disposed on each of the reflection lines L1, L2, L3, . . . undergo the control of the rotation angle of mirror segments of each column in the east-west direction as a group of the mirror segments, whereas the mirror segments 1*a*, 1*b*, . . . disposed thereon undergo the control of the rotation angle of each segment in the south-north direction individually. The rotational angles of the mirror segments are adjusted in the south-north direction and in the east-west direction, and light directly from the sun is received by the mirror segments, and then reflected light is radiated toward the receiver 2 disposed thereabove.

Light reflected from the mirror segments 1*a*, 1*b*, . . . of each column and of each row passes through the heat-absorbing net 8 of the receiver 2, then travels through the inside of a space enclosed by the heat-insulating outer wall 7, and heats a heat medium filling the inside of the heat collecting pipe 6 by means of the heat collecting pipe 6. The heat medium is repeatedly heated to a high temperature during a passage through the heat collecting pipe 6, and is sent to the heat supply source 5. For example, in the heat supply source 5, high-temperature steam is generated and is used for steam turbine power generation, or an endothermic chemical reaction is produced for conversion into chemical energy fuel.

In the embodiment mentioned above, an example has been shown in which an interval between the mirror segments arranged along the reflection lines L1, L2, . . . is constant regardless of whether the distance to the receiver 2 is long or short.

However, the optical loss caused by, for example, blocking between a mirror segment and a subsequent mirror segment becomes greater in proportion to an increase in distance from the receiver 2 although the optical loss caused by blocking between a mirror segment and a subsequent mirror segment is small near the receiver 2 on the reception line. In order to prevent the optical loss caused by, for example, blocking between a mirror segment and a subsequent mirror segment, it is preferable to set the interval between adjoining mirror segments in the column-wise direction to be smaller on the side closer to the reception line, and is preferable to set the interval therebetween to be greater in proportion to an increase in distance from the reception line.

The blocking of reflected light is caused in proportion to an increase in distance from the reception line C, and therefore it is preferable to secure a space between mirror segments by changing forward and backward intervals between mirror segments that are disposed on the north side and on the south side with the reception line C of the receiver 2 as a boundary line between the north side and the south side. However, an interval between every pair of adjoining mirror segments is not necessarily required to be changed, and, as a countermeasure, it is recommended to make a division into several zones in order from a position nearest to the reception line C and to change the number of mirror segments included in each zone.

As described above, according to the present invention, a structure is formed in which the receiver 2 is disposed on the reception line C in the east-west direction, and sunlight received by the mirror segments 1*a*, 1*b*, . . . is radiated to the reception line C while performing the angle adjustment of the mirror segments 1*a*, 1*b*, . . . disposed on the reflection line L, and therefore the amount of adjustment to the angle of a mirror segment in the south-north direction during the tracking of a solar orbit is a small angle of several degrees or less during a day, and is a small angle of several tens of degrees or less even during a year (the amount of adjustment to the mirror angle is about ½ of 23.4 degrees of the earth axis), and therefore the optical loss caused by a variation in the mirror angle is extremely small.

Additionally, the amount of adjustment to the angle of a mirror segment in the east-west direction is fixed merely by collecting light along the reception line, and therefore the mirror setting angle with respect to incident sunlight at the culmination is smaller than the conventional one, and the cosine loss is slight. Additionally, a variation in the optical loss is also slight with respect to a change in the sun altitude during a day, and therefore a variation in heat-collection energy during a day can also be controlled to be small.

Figure 6:
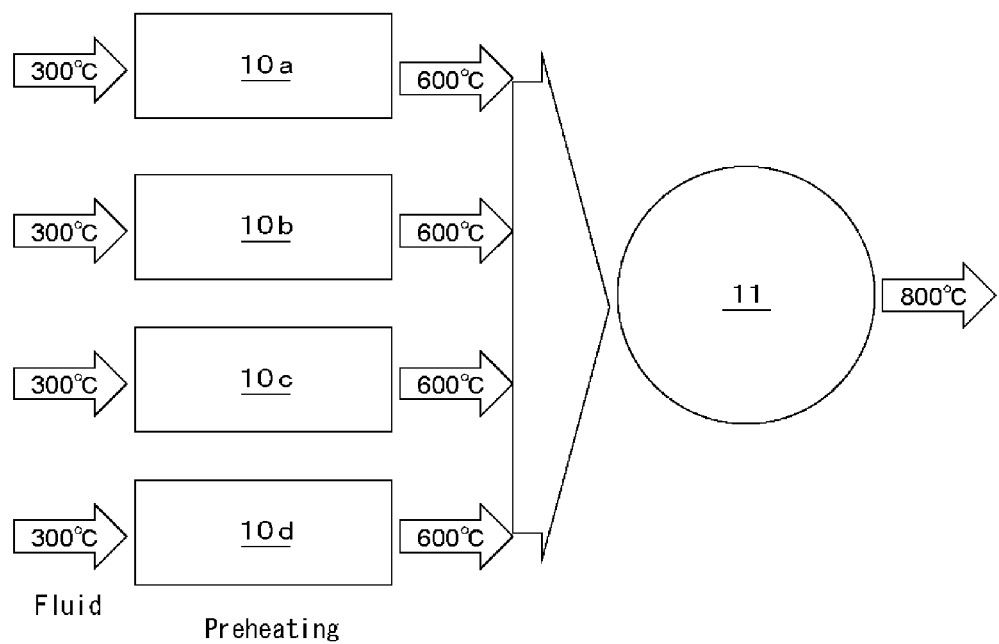
FIG. 6 is a view showing an example of a solar heat collecting apparatus of a solar thermal power generation system in which a preheating means and a principal-heating means are combined with each other.

A heat medium that has been preheated can be heated to an even higher temperature by using the cross linear type solar heat collecting apparatus of the present invention as a relay and by combining this apparatus serving as a relay with a solar heat collecting apparatus having an excellent heat-collecting capability. FIG. 6 shows an example in which four cross linear type solar heat collecting apparatuses 10*a* to 10*d* according to the present invention are each used as a relay to a central tower type solar heat collecting apparatus 11. According to this combination, the temperature of the heat medium can be raised to 600 degrees by dividing a heat medium preheated to 300 degrees for the four cross linear type solar heat collecting apparatuses 10*a* to 10*d* and by heating the heat medium divided therefor, and the heat medium heated by the cross linear type solar heat collecting apparatuses 10*a* to 10*d* is further heated by light collection heat obtained in the central tower type solar heat collecting apparatus 11. As a final result, the heat medium having a high temperature of 800 degrees was obtained.

In a method in which the temperature is raised by collecting light and collecting heat solely by means of the central tower type solar heat collecting apparatus 11, the height of the tower exceeds 100 m, and the heliostat field covers several kilometers in order to realize a plant having a heat collection capability of, for example, a 100 MW class. Therefore, construction cost also becomes huge, and it is difficult to perform a low-cost supply of electric power.

Therefore, as mentioned above, the cross linear type solar heat collecting apparatus of the present invention is used as a preheating means, and is combined with another type of solar heat collecting apparatus, such as a central tower type solar heat collecting apparatus, that serves as a principal-heating means and that is more suitable for high-temperature light collection than the above-mentioned cross linear type solar heat collecting apparatus. The two-stage heating makes it possible to raise the temperature of a heat medium to a targeted high temperature. Additionally, it is possible to realize a high-power solar heat collecting apparatus that is small in heat-collection energy loss, such as re-radiation of heat, and that is low in the construction cost and in the land area, and the thus obtained heat of the high-temperature heat medium can be used as a heat source for solar thermal power generation or as reaction heat of a chemical reaction.

Embodiments of the present invention are shown below.

Example 1

Figure 7:
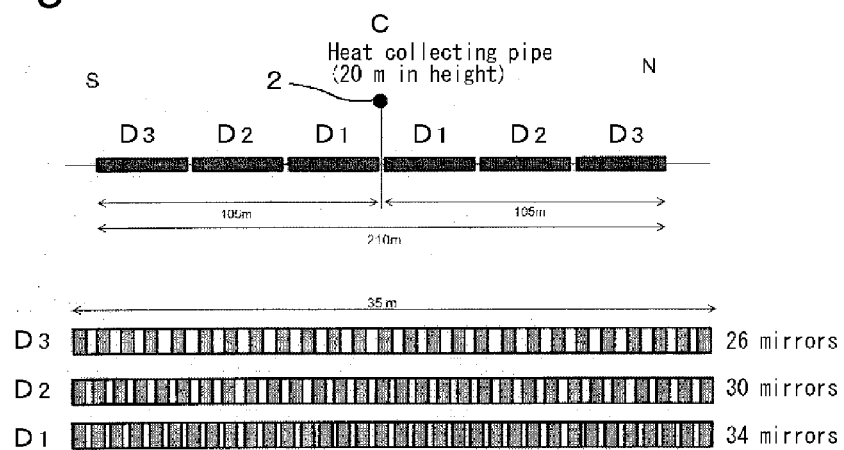
FIG. 7 is a view showing another arrangement example of the mirror segments disposed on the reflection line.

As shown in FIG. 7, a reception line C was set at a position located at a height of 20 m from the center of a reflection line whose length is 210 m, and a receiver 2 was disposed thereon. Each 105-meter range in front of and behind the reception line C was divided into D1 zone, D2 zone, and D3 zone, each of which has a length of 35 m, in order from the position nearest to the reception line C. The number of mirror segments of each zone was 34 in D1 zone, 30 in D2 zone, and 26 in D3 zone. The width of the receiver was set at 0.5 m. Sunlight was received under these conditions. As a result, the amount of heat input to the receiver was about 400 kW/m$^2$ when the sunshine intensity was 0.8 kW/m$^2$.

Seventy lines were arranged, and twenty pipes, into each of which room-temperature air gas was injected from one end (inlet) of the receiver at a pressure of ten atmospheres, were provided in the receiver. The temperature of air at a receiver outlet that passed through the 70 lines was able to be heated substantially to 700 degrees by setting the air flow velocity at about 2.5 m/sec. The light collection energy 400 kW/m$^2$ at a receiver inlet at this time is 5 to 10 times as much as the commonly-used linear Fresnel solar heat collecting apparatus. The total light collection power of the 70 lines was 25 MW.

Example 2

Figure 8A:
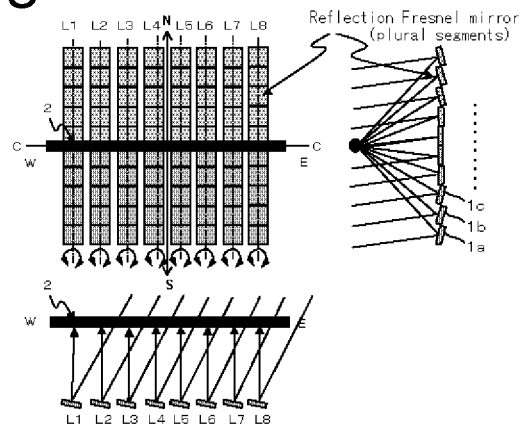
FIG. 8a show a difference between the present invention and the conventional technology, FIG. 8a being a structural model of the present invention, FIG. 8b show a difference between the present invention and the conventional technology, FIG. 8b being a structural model of Conventional Example 1, FIG. 8c show a difference between the present invention and the conventional technology, FIG. 8c being a structural model of Conventional Example 2.
Figure 8B:
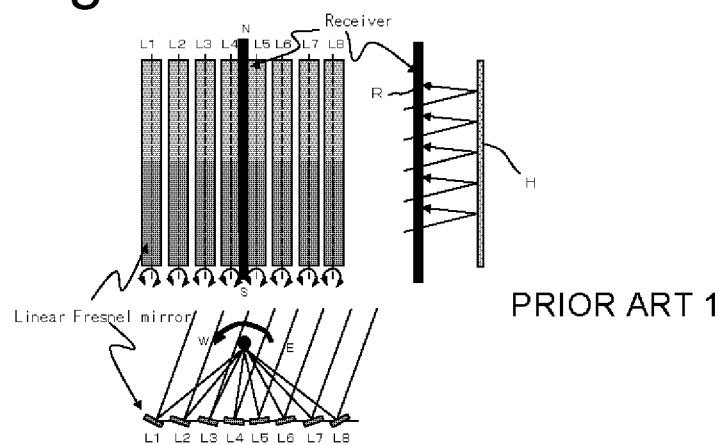
Figure 8C:
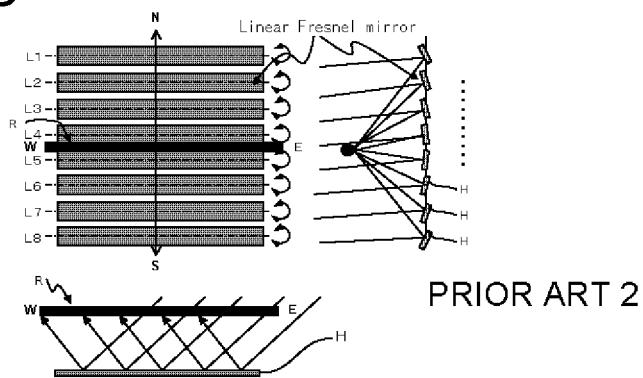

A change in the irradiation energy on the receiver during a day was simulated in Embodiment 2. For comparison, the same simulation was performed in Conventional Examples 1 and 2. To perform this simulation, the structural model of the solar heat collecting apparatus of the present invention and the structural models of the solar heat collecting apparatuses of Conventional Examples 1 and 2 were set under the following same conditions. The structural model of the present invention and the structural models of Conventional Examples 1 and 2 are shown in FIG. 8a to FIG. 8c. FIG. 8a is a view showing the structural model of the present invention, FIG. 8b is a view showing the structural model of Conventional Example 1, and FIG. 8c is a view showing the structural model of Conventional Example 2.

With regard to the solar heat collecting apparatus of each model, the simulation performance date, the simulation performance place, and the simulation setting conditions are as follows.

Figure 9:
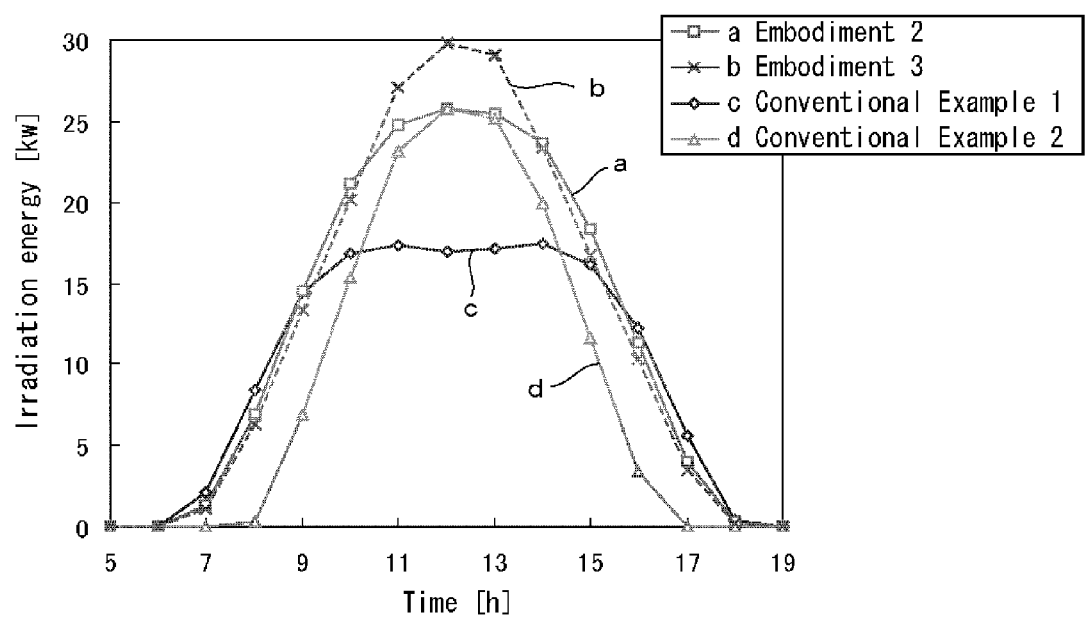
FIG. 9 is a view showing light-collection simulation results of Embodiments 2 and 3 of the present invention and Conventional Examples 1 and 2.

Date: Vernal Equinox Day (Mar. 21, 2011)
Place: Spain Armenian district (Latitude: an angle of 36.84 degrees north/Longitude: an angle of 2.47 degrees west)
Total area of mirror segments: 64 m$^2$
Receiver length: 11 m
Receiver height: 5 m from the ground surface FIG. 9 shows a simulation result obtained by a comparison between Embodiment 2 and Conventional Examples 1 and 2 with respect to a change in irradiation energy on the receiver during a day.

The result obtained thereby is that, when the solar orbit is tracked by use of the solar heat collecting apparatus of the present invention structured to dispose a receiver in the east-west direction and structured to irradiate a reception line while performing the angle adjustment of a mirror segment, the amount of adjustment to the angle of the mirror segment in the south-north direction is a smaller angle of several degrees or less during a day, and is a smaller angle of several tens of degrees or less even during a year (the amount of adjustment to the mirror angle is about ½ of 23.4 degrees of the earth axis) than when the solar heat collecting apparatuses of Conventional Examples 1 and 2 are used, and therefore the optical loss caused by a variation in the mirror angle is extremely small. Additionally, the amount of adjustment to the angle of a mirror segment in the east-west direction is fixed merely by collecting light along the reception line, and therefore the mirror setting angle with respect to incident sunlight at the culmination is smaller than the conventional one, and the cosine loss is slight. Additionally, a variation in the optical loss is also slight with respect to a change in the sun altitude during a day.

Additionally, according to the solar heat collecting apparatus of the present invention, the irradiation energy at the culmination (around 12 o'clock) is higher, and the rise of irradiation energy in the morning and evening also becomes steeper than the solar heat collecting apparatus of Conventional Example 1, and therefore the total cumulative irradiation energy during a day becomes greater than the solar heat collecting apparatus of Conventional Example 2, and it becomes possible to keep the temperature of a heat medium contained in the heat collecting pipe of the receiver at about 700 degrees for a long time.

EXAMPLE 3

Figure 10:
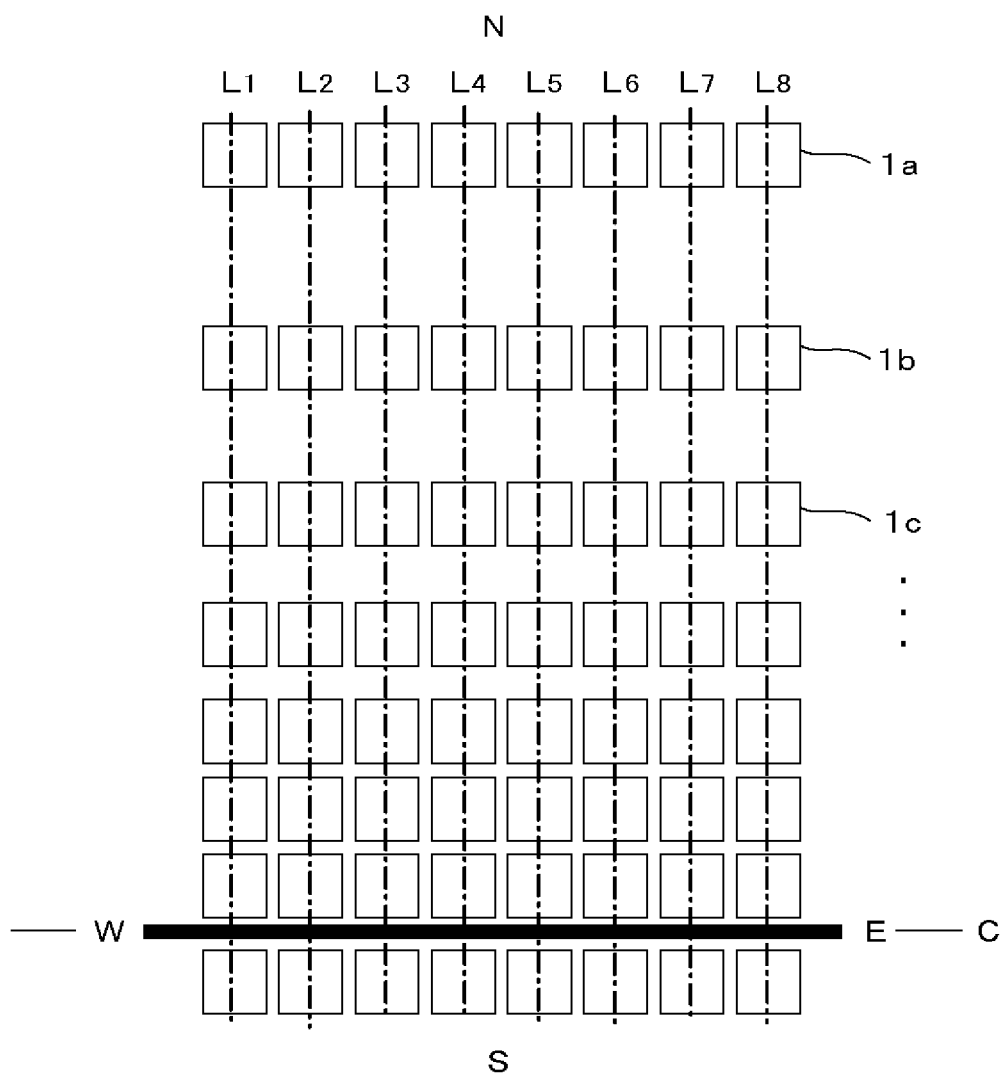
FIG. 10 is a top view of a cross linear type solar heat collecting apparatus according to Embodiment 3 of the present invention.
Figure 11A:
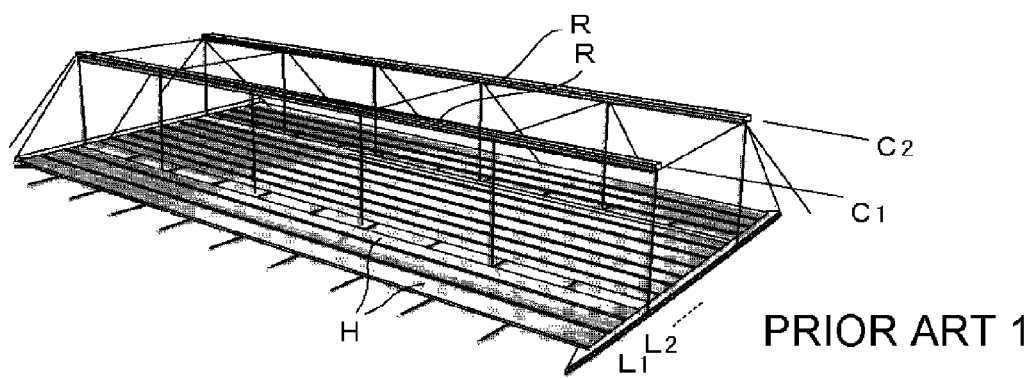
FIG. 11a show an example (i.e., Conventional Example 1) of the conventional linear Fresnel solar heat collecting apparatus.
Figure 11B:
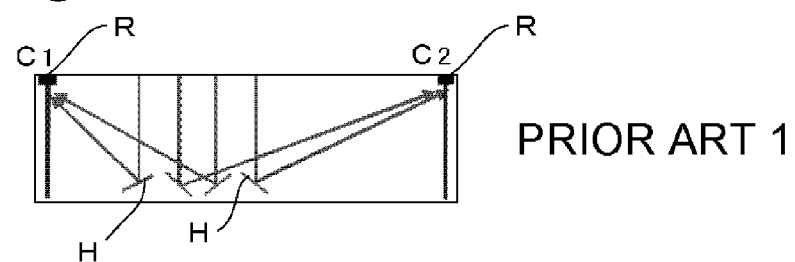
FIG. 11b show an example (i.e., Conventional Example 1) of the conventional linear Fresnel solar heat collecting apparatus.
Figure 12:
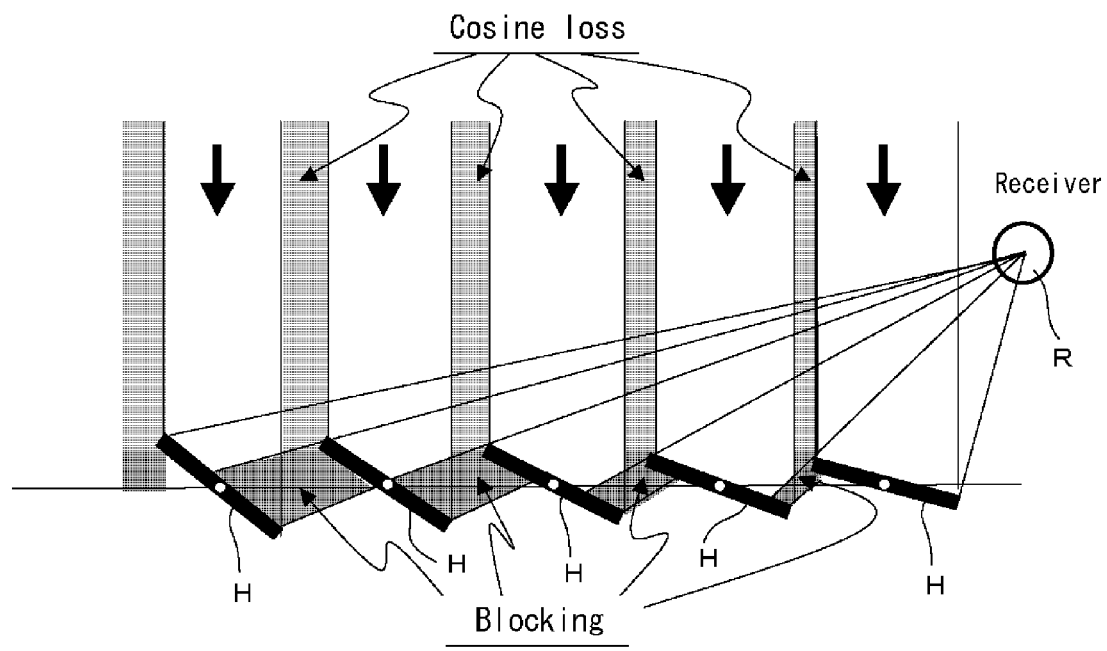
FIG. 12 is a view for describing the optical loss caused by "cosine loss" and "blocking."
Figure 13:
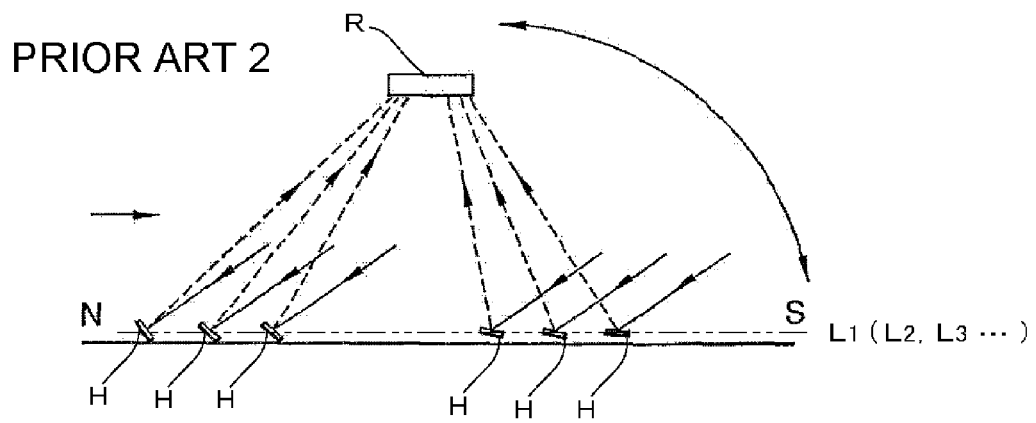
FIG. 13 is a view showing another example (i.e., Conventional Example 2) of the conventional linear Fresnel solar heat collecting apparatus.

A change in irradiation energy on the receiver 2 during a day was simulated in a case in which, as shown in FIG. 10, more mirror segments 1a, 1b, . . . are disposed on the northern side than on the southern side (in the ratio of 1 on the southern side to 7 on the northern side) asymmetrically about the reception line C that is set in the east-west direction (E-W) and that is regarded as a boundary line between the northern side and the southern side, and the range in which the reflection lines L1, L2, . . . are disposed is set so as to be longer in the row-wise direction (south-north direction) than in the column-wise direction (east-west direction). The simulation result is shown as Embodiment 3 in FIG. 9. Mirror segments 1a, 1b, . . . are disposed asymmetrically about the line placed between the southern side and the northern side in accordance with latitude, and, if the installation place of the mirror segments 1a, 1b, . . . is at the northern latitudes (Northern Hemisphere), more mirrors are disposed on the northern side as in Embodiment 3, and, if the installation place thereof is at the southern latitudes (Southern Hemisphere), more mirrors are disposed on the southern side, and, as a result, the cosine loss can be made smaller with respect to each mirror, and the irradiation energy can be increased, as is apparent from FIG. 9.

Additionally, the mirror interval on the northern side that becomes longer in the south-north direction by the south-north asymmetrical arrangement makes it possible to reduce the loss caused by blocking. From a comparison between Embodiment 3 and Conventional Example 1 (especially, at around the culmination), it is understood that the irradiation energy is increased, as is apparent from FIG. 9.

According to the present invention, light reflected from mirror segments disposed on each reflection line extending in the south-north direction is radiated toward a receiver disposed on a reception line that perpendicularly intersect each reflection line and that is set thereabove, and therefore heat can be collected from a vast range onto the single receiver disposed on the reception line without limitations on the number of reflection lines, and the degree of light convergence of sunlight is heightened, and it is possible to easily realize the degree of light convergence of 10 to 30 times that of the conventional linear Fresnel solar heat collecting apparatus.

Additionally, according to the present invention, a 100 MW-class solar heat collector can be designed by setting the height of a reception line of a receiver within the range of 5 to 30 meters, and water vapor having a high temperature of 500 degrees to 600 degrees can be easily obtained. Additionally, the utilization factor of the land area is two to three times as high as the central tower type solar heat collecting apparatus, and a compact power station can be constructed.

INDUSTRIAL APPLICABILITY

According to the present invention, it is possible to create fuel production in which the collected solar thermal energy is used for the endothermic reaction of a chemical reaction, and it is possible to stably supply the generated electric power. Additionally, for example, the discharge of carbon dioxide in a methanol production process can be greatly reduced by applying the present invention to a technique that synthetically produces methanol from carbon monoxide, and the present invention is widely applicable to various technical fields, such as seawater desalting technology as well as solar thermal power generation and chemical plants.

REFERENCE SIGNS LIST

L1, L2, . . . Reflection line;
C Reception line;
Z Heat receiving zone;
1 Heliostat;
1a, 1b, 1c, . . . Mirror segment;
2 Receiver;
3 Column-wise-direction driver;
4a, 4b, . . . Row-wise-direction driver;
5 Heat supply source;
6 Heat collecting pipe;
7 Heat-insulating outer wall;
8 Heat-absorbing net

The invention claimed is:

1. A cross linear type solar heat collecting apparatus comprising a plurality of reflection lines and one reception line; the plurality of reflection lines being arranged in parallel in a south-north direction on earth;
each of the plurality of reflection lines being provided with a heliostat composed of a plurality of mirror segments;
the reception line extending in an east-west direction that perpendicularly intersects the plurality of reflection lines and being disposed above the plurality of reflection lines;
the mirror segments placed on each reflection line being adjustable to a turning angle in the south-north direction and in the east-west direction;
the reception line being provided with a single receiver;
reflected light of sunlight that has impinged on each mirror segment of the heliostat of the reflection line being radiated toward the reception line while allowing the mirror segment to undergo angle adjustment; and
the receiver of the reception line collecting heat of the reflected light of the sunlight radiated from the heliostat.

2. The cross linear type solar heat collecting apparatus according to claim 1, wherein the receiver of the reception line has a heat collecting pipe in which a heat medium is contained, and
the heat collecting pipe is divided into an irradiation range that is irradiated with light reflected from the mirror segment of the reflection line and a non-irradiation range secured at both ends of the irradiation range.

3. The cross linear type solar heat collecting apparatus according to claim 2, wherein the irradiation range is a range that transfers heat from the irradiation range to the non-irradiation range by being heated by the reflected light of sunlight and that allows the heat medium contained in the heat collecting pipe to make a heat transfer.

4. The cross linear type solar heat collecting apparatus according to claim 1, wherein the mirror segments placed on each reflection line are arranged to be aligned in a row-wise direction, which is the south-north direction, and are adjustable to a turning angle in the east-west direction and in the south-north direction, and
rotation angles of the mirror segments in a column-wise direction, which is the east-west direction, on the reflection lines are adjusted together as a group, whereas rotation angles of the mirror segments arranged in the row-wise direction are adjusted individually.

5. The cross linear type solar heat collecting apparatus according to claim 1, wherein the mirror segment is set as a typical module in which a length in a row-wise direction which is the south-north direction, is twice as long as a length in a column-wise direction, which is the east-west direction, and
several mirror segments of the plurality of mirror segments arranged in series are set as one group, and are arranged so that the one group faces one group of the plurality of mirror segments with respect to a position of the reception line placed between the one group and the another group on each reflection line.

6. The cross linear type solar heat collecting apparatus according to claim 1, wherein an interval between the mirror segments that adjoin each other in a row-wise direction which is the south-north direction, is set to be smaller on a side closer to the reception line, and is set to become greater in proportion to an increase in distance from the reception line so as to reduce optical loss caused by blocking and by shadowing between the adjoining mirror segments.

7. The cross linear type solar heat collecting apparatus according to claim 1, wherein, when a linear type solar heat collecting apparatus is installed in Northern Hemisphere, a length of the reflection line is set so that a northern reflection line on a northern side is longer than a southern reflection line on a southern side with the reception line extending in the east-west direction as a boundary line between the northern side and the southern side, and
when the linear type solar heat collecting apparatus is installed in Southern Hemisphere, the length of the reflection line is set so that the southern reflection line on the southern side is longer than the northern reflection line on the northern side with the reception line extending in the east-west direction as a boundary line therebetween.

8. The cross linear type solar heat collecting apparatus according to claim 1, wherein the single receiver has a heat collecting pipe whose inside is filled with a heat medium, and is disposed above the plurality of reflection lines of the heliostats in such a manner as to extend across the plurality of reflection lines, and has one end connected to a heat supply source; and
the heat collecting pipe receives light reflected from the heliostat, and collects heat of the heat medium heated to a high temperature.

9. The cross linear type solar heat collecting apparatus according to claim 1, wherein the single receiver has several heat collecting pipes arranged in parallel;
a space above rows of the heat collecting pipes is covered with a heat-insulating outer wall;
a heat-absorbing net that has a cavity window function is placed directly under the rows of the heat collecting pipes;
the heat-insulating outer wall is a cross-sectionally circular-arc cover, and contains a group of the heat collecting pipes arranged in parallel;
both edges of the heat-insulating outer wall project downwardly from edges of the heat-absorbing net;
the heat-absorbing net is a stainless mesh that has a parallel-crosses structure having a predetermined thickness or that has a honeycomb structure; and
the light reflected from the heliostat passes through a mesh wall and travels inwardly, and radiation light does not easily come out from inside the mesh wall.

10. A solar heat collecting apparatus formed by combining a preheating device and a principal-heating device together, wherein the preheating device is a device for heating to a first temperature that is lower than a target temperature by use of the cross linear type solar heat collecting apparatus defined in claim 1 as a relay, whereas the principal-heating device is a device for raising temperature to a second temperature that is the target temperature by use of another type of solar heat collecting apparatus that is more suitable for high-temperature light collection than the cross linear type solar heat collecting apparatus.

11. The cross linear type solar heat collecting apparatus according to claim 1, wherein the receiver of the reception line has a heat collecting pipe in which a heat medium is contained, and
the heat collecting pipe is divided into an irradiation range that is irradiated with light reflected from the mirror segment of the reflection line and a non-irradiation range secured at both ends of the irradiation range, and
a non-irradiation range is secured within the extent of a predetermined length between adjoining ranges of the irradiation ranges, and the irradiation ranges are substantially evenly separated and disposed over the substantially overall length of the length of the heat collecting pipe.

12. A cross linear type solar heat collecting apparatus comprising a plurality of reflection lines and one reception line;
the plurality of reflection lines being arranged in parallel in a south-north direction on earth;
each of the plurality of reflection lines being provided with a heliostat composed of a plurality of mirror segments;
the reception line extending in an east-west direction that perpendicularly intersects the plurality of reflection lines and being disposed above the plurality of reflection lines;
the reception line being provided with a single receiver;
reflected light of sunlight that has impinged on each mirror segment of the heliostat of the reflection line being radiated toward the reception line while allowing the mirror segment to undergo angle adjustment; and
the receiver of the reception line collecting heat of the reflected light of the sunlight radiated from the heliostat,
wherein the receiver of the reception line has a heat collecting pipe in which a heat medium is contained, and
the heat collecting pipe is divided into an irradiation range that is irradiated with light reflected from the mirror segment of the reflection line and a non-irradiation range secured at both ends of the irradiation range.

13. A cross linear type solar heat collecting apparatus comprising a plurality of reflection lines and one reception line;
the plurality of reflection lines being arranged in parallel in a south-north direction on earth;
each of the plurality of reflection lines being provided with a heliostat composed of a plurality of mirror segments;
the reception line extending in an east-west direction that perpendicularly intersects the plurality of reflection lines and being disposed above the plurality of reflection lines;
the reception line being provided with a single receiver;
reflected light of sunlight that has impinged on each mirror segment of the heliostat of the reflection line being radiated toward the reception line while allowing the mirror segment to undergo angle adjustment; and
the receiver of the reception line collecting heat of the reflected light of the sunlight radiated from the heliostat,
wherein an interval between the mirror segments that adjoin each other in a row-wise direction, which is the south-north direction, is set to be smaller on a side closer to the reception line, and is set to become greater in proportion to an increase in distance from the reception line so as to reduce optical loss caused by blocking and by shadowing between the adjoining mirror segments.

* * * * *